3,337,302
DESULFURIZATION OF CHLORINE

Franciscus J. F. van der Plas and Walter J. M. Rootsaert, Amsterdam, Netherlands, assignors to Shell Oil Company, New York, N.Y., a corporation of Delaware
No Drawing. Filed Nov. 23, 1964, Ser. No. 413,294
Claims priority, application Netherlands, Nov. 28, 1963, 301,064
2 Claims. (Cl. 23—219)

ABSTRACT OF THE DISCLOSURE

Removal of sulfur chloride from chlorine by contact with silica gel containing bound water.

---

The invention relates to a process for the purification of chlorine in which sulfur-containing contaminants are removed by adsorption.

In various processes for the preparation of chlorine, the chlorine produced contains small quantities of sulfur-containing contaminants. Such a case occurs when the chlorine originates from a reaction mixture from which it has been separated by treating the mixture with sulfur monochloride and then desorbing the chlorine adsorbed. After desorption the chlorine thus obtained usually contains sulfur-containing contaminants including sulfur compounds such as, sulfur dichloride, formed for example by reaction of chlorine with sulfur monochloride, and sulfur monochloride. In addition, very small quantities of sulfur oxychloride and/or oxides of sulfur may be present in the chlorine.

Although the quantities of these impurities are generally relatively small, mostly less than 0.1% by weight, it is very important that the sulfur-containing contaminants be removed from the chlorine at least substantially completely because chlorine whose sulfur content exceeds a value of, for example, about 5 parts of sulfur per million parts of chlorine (5 p.p.m.) loses its suitability for numerous practical applications.

Various methods have been proposed heretofore for the removal of sulfur-containing contaminants from chlorine. A method is known, for example, in which chlorine gas contaminated with sulfur monochloride is treated with water vapor. A drawback of this method, however, is that an extremely corrosive mixture of chlorine, hydrogen chloride and water is formed, so that the equipment requires very expensive corrosion-resistant materials.

Another known method for the removal of sulfur monochloride from gaseous chlorine is to treat the contaminated gas with solid adsorbents. However, this method is not applicable to the purification of liquid chlorine. Another drawback is that the usual solid adsorbents have a relatively low adsorption capacity, so that commercial-scale applications require large quantities of these adsorbents.

In accordance with the present invention, sulfur-containing contaminants are removed from chlorine by direct contact of the chlorine containing the sulfur contaminants with water bound to a solid adsorptive material.

The invention is applied to the purification of chlorine contaminated with sulfur compounds broadly. It is applied with particular advantage to the removal of sulfur chlorides.

The chlorine to be purified may be contacted in the liquid state and/or in the gaseous state with the adsorbed water.

Contact between the contaminated chlorine and the adsorbed water results in chemical reaction involving chlorine, water and sulfur compounds present in the chlorine and in which sulfuric acid and hydrogen chloride are formed.

Adsorptive materials employed in the process of the invention comprise the solid adsorbents capable of forming with water a bond strong enough to prevent more than minor quantities of water from being removed with the purified chlorine from the system. Complete occlusion of all of the water present in the pores of the adsorbent, or the presence of all of the water exclusively as water of crystallization, would generally lead to a situation in which the bond between adsorbent and water is such that the water present is inert with respect to the contaminants to be removed. In the adsorption system applied in the present invention at least part of the water present in the system will react with the contaminants.

Preferred are solid adsorptive materials having a surface area of at least 20 m.$^2$/g., in particular at least 50 m.$^2$/g., and up to 1000 m.$^2$/g. and higher, and whose average pore diameter is larger than the molecular diameter of the sulfur compound to be removed. For the purification of liquid chlorine the size of the adsorbent particles becomes more important. Preference is given to particles with an average diameter of at most 2 mm. Although adsorbents with a greater or lesser particle diameter may be used within the scope of the invention.

Siliceous adsorptive materials, for example, adsorbents consisting essentially of oxides of silicon, such as silica gel, are generally preferred. Adsorbents consisting essentially of the silicon oxides in combination with other adsorbent materials such as, for example, silica-alumina, the adsorptive aluminas, active charcoals, and the like, are found to be satisfactory.

The relative quantities of the suitable adsorbents employed in the process relative to the quantity of chlorine to be purified, may vary within very wide limits. The preferred quantity of adsorption material to be applied is dependent to some extent upon water content of the particular adsorbent employed. Very favorable results are obtained when at least four molecules of water are present per atom of sulfur to be removed.

It is preferred that the water content of the adsorptive-bound water system be not substantially higher than about 40 percent by weight, and preferably not higher than about 10 percent by weight. A water content of about 0.5 percent by weight and less may suitably be employed within the scope of the invention.

Temperatures of between about —10° C. and about 100° C. are suitable. Temperatures between 10° C. and 60° C. are preferred. The reaction between sulfur compounds and adsorbed water proceeds very smoothly, even at these relatively low temperatures. The time of contact of the contaminated chlorine with the bound water-solid adsorptive can therefore be relatively short. In purifying liquid chlorine contact times of between about 0.25 and about 1 hour are suitable. For the purification of gaseous chlorine contact times between about 2 and about 20 seconds are particularly recommended. Longer or shorter contact times may however be employed within the scope of the invention.

The chlorine is generally fed to the purification equipment at greater than atmospheric pressure, although atmospheric pressures and less can be employed. Preference is given to the use of a partial chlorine pressure of up to about 50 atm., in particular between about 5 and about 15 atm.

Any suitable conventional apparatus providing one or more contacting zones enabling direct contact of the sulfur-contaminated chlorine charge with one or more beds of the adsorbent comprising adsorbed water, under the conditions defined herein may be used. Then using a plurality of contacting zones, these may be arranged in series or parallel flow. The use of a plurality of contacting zones arranged in parallel flow is generally preferred since it enables continuous operation without interruption. An individual zone wherein the adsorbed water has been at least partially converted as a consequent of the purification may be shut down without interrupting the continuous operation of the remaining zone or zones. The spent adsorbent may be replaced by fresh adsorbent comprising adsorbed (bound) water, or it may be regenerated in situ by removing the sulfuric acid reaction product therefrom and replacing the bound water content.

The invention is appled wtih advantage to the removal of sulfur contaminants, present in only trace amounts, from chlorine. Sulfur contaminants present in larger amounts, up to about 0.1% by weight and more, in the chlorine are readily reduced with a minimum of operative procedure to 5 parts per million and less. Comprised within the scope of the invention is the treatment of chlorine containing higher concentrations, for example, up to about 10% by weight of sulfur-containing contaminants.

*Example I*

In the continuous purification of contaminated chlorine use was made of a vertically placed tubular reactor containing silica gel with a bound water content of 35 percent by weight. The surface area of the silica gel was 730 m.$^2$/g. and the average pore diameter 24 A.

At a pressure of 7 atmospheres and at a temperature of 25° C., liquid chlorine contaminated with sulfur compounds was passed continuously through the reactor from the bottom upwards. The content of sulfur present in the chlorine charge as $SCl_2$ was 200 p.p.m.

The feed rate was such that the chlorine passed into the reactor remained in contact with the adsorbent for about 1 hour. After the silica gel had taken up an amount of sulfur equal to 3 percent of its weight, the operation was discontinued. The chlorine discharged from the reactor during all this time had a sulfur content of $\leq$5 p.p.m.

*Example II*

Under substantially identical conditions as described in Example I an operation was carried out in which the silica gel used as adsorbent had a bound water content of 15 percent by weight. The operation was continued until a quantity of sulfur had been taken up corresponding to 6 percent by weight calculated on silica gel. The chlorine discharged from the reactor had at all times a sulfur content of $\leq$5 p.p.m.

*Example III*

In this operation, the chlorine to be purified originated from the known method for the preparation of chlorine by oxidation of hydrogen chloride with air. From the product gas thus obtained the chlorine formed was separated by an absoprtive treatment with $S_2Cl_2$. Subsequently chlorine and absorbent were separated in a desorbing unit. The chlorine thus obtained was contaminated with 170 p.p.m. of sulfur in the form of $SCl_2$.

The purification of the sulfur contaminated chlorine was performed in an installation consisting of two vertical adsorption columns connected in parallel. The columns contained silica gel granules with a bound-water content of 4 percent by weight. The average diameter of the granules was 1.5 mm., the average pore diameter 27 A. and the surface area 620 m.$^2$/g. The dimensions of the columns were as follows: length 0.50 m., diameter 0.03 m.

The chlorine feed contaminated with $SCl_2$ was fed to the bottom of one of the adsorption columns, in which a temperature of 24° C. prevailed, at a pressure of 5.5 atm.

The feed rate was 2 ml. of gas per minute per g. of silica gel.

The chlorine discharged from the column contained less than 3 p.p.m. of sulfur and less than 20 p.p.m. of water. The water content could be further reduced by means of condensation.

After about 50 hours of continuous operation, the chlorine feed was diverted to the second of the two columns and the spent adsorbent in the first column was regenerated. Regeneration of the spent adsorbent was effected by removing the sulfuric acid content thereof, formed as a consequence of the reaction of bound water with the sulfur contaminants, and restoring its bound water content to 5% by weight.

*Example IV (not according to the invention)*

In the comparative experiment chlorine contaminated with 200 p.p.m. of sulfur was contacted with water-free silica gel. Other conditions were substantially the same as applied in the operation of Example II. After 0.1 percent by weight of sulfur had been taken up by the silica gel, based on silica gel, no further sulfur was adsorbed any more.

We claim as our invention:

1. The process for reducing the sulfur content of sulfur dichloride contaminated chlorine having a sulfur content of at least 0.1% by weight to less than about 5 parts per million, which consists essentially of contacting said sulfur dichloride contaminated chlorine with silica gel having a surface area of from about 50 to about 1000 m.$^2$/g. and an adsorbed water content of from about 0.5 to about 40% by weight, at a temperature of from about 10 to about 60° C.

2. The process for reducing the sulfur content of sulfur dichloride contaminated chlorine, which consists essentially of contacting said sulfur dichloride contaminated chlorine, at a temperature of from about −10 to about 100° C., with silica gel having a surface area of at least 20 m.$^2$/g. and having an adsorbed water content of from about 0.5 to about 40% by weight.

References Cited

UNITED STATES PATENTS

| | | | |
|---|---|---|---|
| 1,692,847 | 11/1928 | Leach | 23—219 X |
| 2,240,668 | 5/1941 | Reed | 23—219 |
| 2,586,606 | 2/1952 | Bonnington | 23—219 X |
| 2,692,818 | 10/1954 | Bewick | 23—219 |
| 2,786,816 | 3/1957 | Guerin | 23—219 X |
| 2,910,140 | 10/1959 | Bencker et al. | 23—219 X |
| 3,168,376 | 2/1965 | Neely | 23—219 |
| 3,205,178 | 9/1965 | Orzechowski et al. | 23—87 X |

OSCAR R. VERTIZ, *Primary Examiner.*

EDWARD STERN, *Assistant Examiner.*